_United States Patent_ [19]

Crockett

[11] Patent Number: 4,530,091

[45] Date of Patent: Jul. 16, 1985

[54] SYNCHRONIZATION OF REAL-TIME CLOCKS IN A PACKET SWITCHING SYSTEM

[75] Inventor: Gary B. Crockett, Hinsdale, Ill.

[73] Assignee: AT&T Bell Laboratories, Murray Hill, N.J.

[21] Appl. No.: 512,209

[22] Filed: Jul. 8, 1983

[51] Int. Cl.[3] .......................................... H04Q 11/04
[52] U.S. Cl. ..................................... 370/60; 370/103
[58] Field of Search ................. 370/60, 94, 103, 100; 375/107

[56] References Cited

U.S. PATENT DOCUMENTS

| 3,861,134 | 1/1975 | Chacon et al. | 58/24 |
|---|---|---|---|
| 4,142,069 | 2/1979 | Stover | 370/103 |
| 4,253,181 | 2/1981 | Watten | 370/103 |
| 4,339,817 | 7/1982 | Hata et al. | 370/103 |

FOREIGN PATENT DOCUMENTS 3015234 10/1981 Fed. Rep. of Germany .
57-104883 6/1982 Japan .

OTHER PUBLICATIONS

1979 _Proceedings of 1st International Conference on Distributed Computing Systems, IEEE_, Oct. 1-5, 1979, Illinois, "Setting Clocks 'Back' In A Distributed Computing System", pp. 612-616.

_Primary Examiner_—Douglas W. Olms
_Attorney, Agent, or Firm_—John C. Moran

[57] ABSTRACT

A packet switching system in which a remote real-time clock is accurately synchronized to a standard real-time clock via X.25 (CCITT) controlled high-speed transmission links. Synchronization is achieved by the transmission of an interrupt packet and a data packet between a remote processor controlling the remote real-time clock and an administrative processor controlling the standard real-time clock. Synchronization involves the following steps: (1) assembling an interrupt packet comprising the least significant bits of the remote real-time clock for transmission to the administrative processor by the remote processor, (2) calculating bits representing the difference between the transmitted least significant bits of the remote real-time clock and the least significant bits of the standard real-time clock by the administrative processor, (3) assembling a data packet comprising bits representing the state of the standard real-time clock and the difference bits for transmission to the remote processor by the administrative processor, (4) adding the difference bits to the bits representing the state of the remote real-time clock by the remote processor, and (5) adding a predefined value to the most significant bits of the remote real-time clock by the remote processor if the transmitted least significant bits of the standard real-time clock are numerically greater than the least significant bits of the remote real-time clock.

17 Claims, 7 Drawing Figures

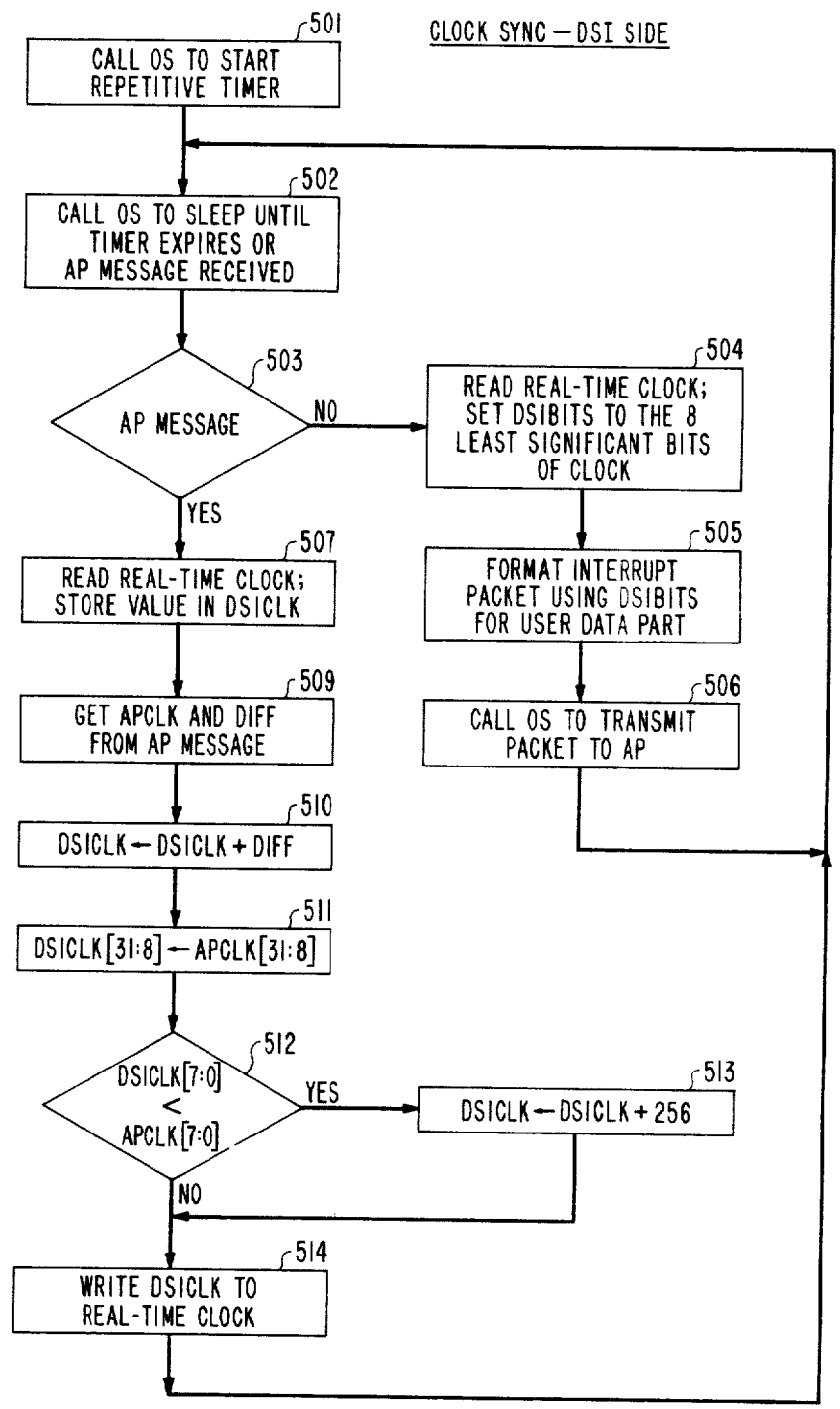

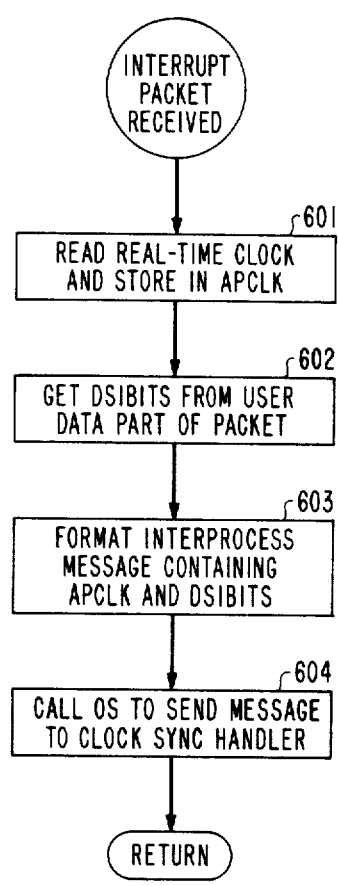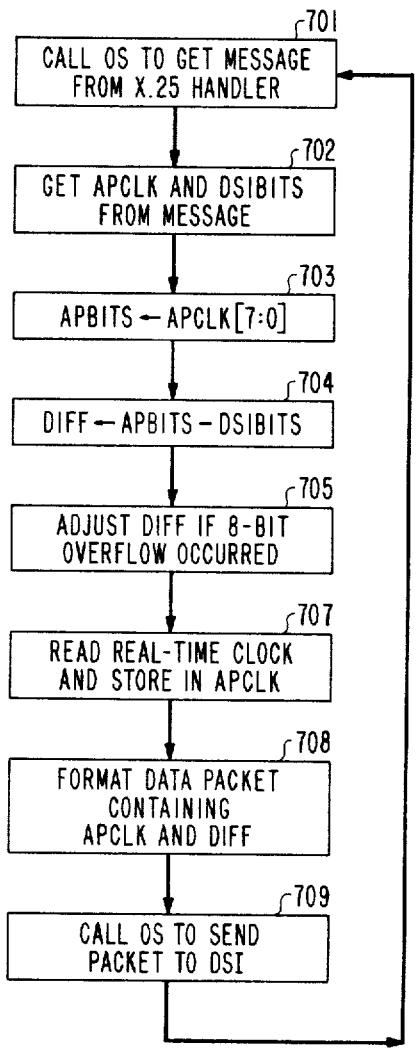

SYNCHRONIZATION OF REAL-TIME CLOCKS IN A PACKET SWITCHING SYSTEM

CROSS-REFERENCE TO RELATED APPLICATIONS

The following applications were filed on Mar. 31, 1983, and assigned to the same assignee as this application:

Chu-Hinch-Johnson-Kafka-Stelte, Case 1-1-1-1-1, "Digital Multi-Customer Data Interface", Ser. No. 481,057;

M. G. Hinch, Case 2, "A Shared Memory With Two Distinct Addressing Structures", Ser. No. 481,056;

K. A. Hedlund, Case 1, "Multiline Error Detection Circuit", Ser. No. 481,058; and J. M. Johnson, Jr., Case 2, "Loop-Around Testing Facilities for a Multiline Protocol Controller", Ser. No. 481,055.

TECHNIAL FIELD

This invention relates to a method and apparatus for synchronizing real-time clocks. The invention particularly pertains to the use of interrupt and data packets for communicating clock synchronizing information.

BACKGROUND OF THE INVENTION

In packet switching systems, a large number of customers are typically connected to a main packet switching network via digital customer interfaces. Each interface accepts packets from the customer via low-speed transmission links and retransmits them to the switching network via a high-speed transmission link. In such packet switching systems, an administrative processor performs the administrative functions such as network usage billing and is associated with the main packet switching network. Each digital customer interface monitors and reports to the administrative processor the network usage of each of its customers. Customers are charged for network usage according to the number of packets they send and receive; the charge varies according to the time of day when each packet is sent. Due to the sensitivity of customers to overbilling, it is important that the real-time clocks in the digital customer interfaces be synchronized to the correct time of day, which is maintained by a real-time clock in the administrative processor. Such synchronization requires the interchange of messages containing the state of the real-time clocks in the administrative processor and the digital customer interfaces.

The most efficient manner to communicate real-time clock information is via the high-speed transmission links interconnecting the digital customer interfaces to the main packet switching network. When the transmission on the high-speed link is controlled by a more complex protocol such as X.25 (CCITT 1976, Amended 1980), a problem exists in that such a sophisticated protocol incorporates data for controlling the flow of packets under certain traffic conditions and particularly when the packet rate exceeds an arbitrary level. Flow control causes variable delays in the transmission of packets. The introduction of unpredictable packet delay makes an X.25 controlled transmission link unsuitable for the communication of clock synchronizing information since it is necessary to minimize and accurately predict packet transmission delay during real-time clock synchronization.

In prior art systems, this problem is solved by providing a separate communication channel between the digital customer interface and the administrative processor. Such a separate channel is not subject to the possibility of undesirable transmission delay due to flow control since it is not controlled by a sophisticated protocol. A dial-up telephone link has been used between the digital customer interface and the administrative processor for this purpose. Such an approach suffers from the disadvantages of dial-up operations, added control complexity, and higher system costs.

SUMMARY OF THE INVENTION

In an illustrative method and structural embodiment, a departure in the art is achieved using interrupt and data communication packets for achieving accurate real-time clock synchronization over a standard communication channel (X.25-controlled channel for example) by eliminating the heretofore objectionable flow control operations. The novel arrangement allows the accurate synchronization of a real-time clock incorporated in a remote processor of a digital customer interface with a standard real-time clock incorporated in an administrative processor of a main packet switching network. The interrupt packet is used in my novel method to initiate synchronizing operations between the remote and administrative processors and concurrently to send a limited amount of synchronization data from the remote processor to the administrative processor. According to the X.25 protocol, the interrupt packet has a limited data capacity which is inadequate to achieve a degree of clock synchronization needed for commercial applications. I therefore have discovered that the use of the interrupt packet coupled with a complementary data packet allows all needed synchronization data to be communicated between the processors to achieve the required synchronization.

By way of example, the limited synchronization data communicated by the interrupt packet represents a limited segment of the remote processor clock's information, such as a range of "hundreds" of milliseconds of timing. The interrupt packet is sent from the remote processor to the administrative processor and advantageously causes the latter to calculate a correction factor. It does so illustratively by determining a difference between the limited segment of the interrupt packet and a corresponding segment of the administrative processor's standard real-time clock. Thereafter, the administrative processor formulates the data packet comprising the correction factor and other of the standard real-time clock's information for transmission to the remote processor. The data packet is subject to some flow control delay, according to the X.25 protocol, but that delay is tolerable because the data packet advantageously includes the correction factor information rather than absolute time information. The remote processor advantageously utilizes the received data packet with the correction factor to fully update and synchronize the remote real-time clock with the standard real-time clock for all system timing operations.

Specifically, the exemplary method synchronizes two real-time clocks by utilizing only two packets, namely the interrupt and the data packet. Each real-time clock is maintained in memory by an individual controlling processor. For example, the standard real-time clock physically comprises memory locations in the administrative processor memory. The administrative processor is responsive to a periodic interrupt signal from an administrative processor hardware timer to increment these memory locations using well known software techniques so that these memory locations contain bits representing the correct time of day. Similarly, the remote processor maintains the remote real-time clock. The method of synchronizing the two real-time clocks involves the following steps: (1) assembling an interrupt packet comprising the least significant bits of the remote real-time clock by the remote processor for transmission to the administrative processor, (2) assembling a data packet by the administrative processor in response to the interrupt packet for transmission to the remote processor that packet comprising bits representing the state of the standard real-time clock and bits representing the difference between the least significant bits of the standard real-time clock and the transmitted least significant bits of the remote real-time clock, and (3) synchronizing the remote real-time clock with the standard real-time clock in response to the data packet.

The synchronizing step comprises the step of adding the difference bits to the contents of the remote real-time clock. In addition, the synchronizing step comprises the following steps: replacing the most significant bits of the remote real-time clock with the transmitted most significant bits of the standard real-time clock and adding a predefined value to the most significant bits of the remote real-time clock upon the transmitted least significant bits of the standard real-time clock being numerically greater than the least significant bits of the remote real-time clock. This last step takes advantage of the fact that true time is equal to or greater than the time at which the data packet was formed in the administrative processor. Therefore, if the corrected least significant bits of the remote real-time clock are less than the transmitted least significant bits of the standard real-time clock, the remote real-time clock's least significant bits have been incremented through zero, and the remote real-time clock's most significant bits must be updated to compensate for this fact.

The structural embodiment synchronizes a remote real-time clock to a standard real-time clock in the following manner. A remote processor incorporating the remote real-time clock assembles an interrupt packet comprising the least significant bits of the remote real-time clock and transmits the interrupt packet to an administrative processor incorporating the standard real-time clock. Upon receipt of the interrupt packet, the administrative processor determines bits representing the difference between the transmitted least significant bits and least significant bits of the standard real-time clock. Then, the administrative processor transmits a data packet to the remote processor containing bits representing the state of the standard real-time clock and the difference bits. In response to the receipt of the data packet, the remote processor synchronizes the real-time clock with the standard real-time clock.

Advantageously, the remote processor adds the difference bits to the contents of the remote real-time clock to synchronize it. Also, in synchronizing the remote real-time clock, the remote processor replaces the most significant bits of the remote real-time clock with the transmitted most significant bits of the standard real-time clock. If the transmitted least significant bits of the standard real-time clock are numerically greater than the least significant bits of the remote real-time clock, the remote processor adds a predefined value to the most significant bits of the contents of the remote real-time clock to synchronize the most significant bits of the remote real-time clock with the most significant bits of the standard real-time clock.

BRIEF DESCRIPTION OF THE DRAWING

In general, system elements, when first introduced on a figure, are each designated with a number that uses the figure number as the most significant digits of the element number.

FIG. 5 is a flow chart of the DSI clock sync process utilizing the present invention;

FIG. 6 is a flow chart of the AP X.25 handler process utilizing the present invention; and FIG. 7 is a flow chart of the AP clock sync handler process utilizing the present invention.

The principles of this invention are disclosed as incorporated, by way of example, in a packet switching system of the type disclosed in Chu-Hinch-Johnson-Kafka-Stelte, Case 1-1-1-1-1, "Digital Multi-Customer Data Interface", Ser. No. 481,057. The latter disclosure maybe consulted for an understanding of the construction and operation of the elements illustrated in FIGS. 1 and 2.

DETAILED DESCRIPTION

Figure 1:
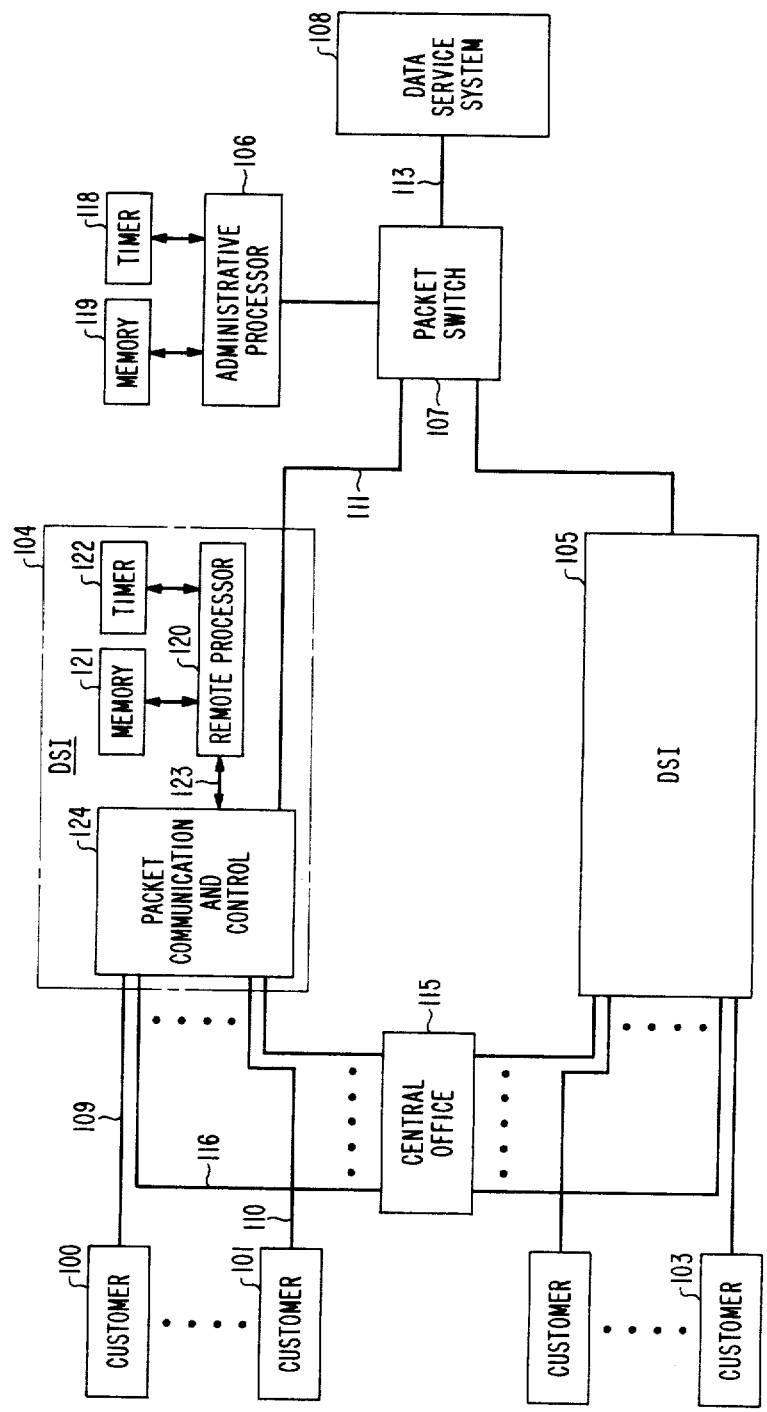
FIG. 1 is a block diagram of an illustrative data transport system.

FIG. 1 shows an illustrative data transport system having a plurality of data subscriber interfaces 104 and 105 serving a plurality of customers, such as customer 100 or 103. The customer transmission paths can simultaneously be used for normal voice communications via central office 115, and for data communication via data subscriber interface 104 or 105. The data transport system provides data communication services such as interactive videotex services between up to 128 customers per data subscriber interface and data service system 108. All data transfer between the individual customers and data service system 108 is done via packets. Packets from the individual customers are multiplexed by data subscriber interface 104 or 105 and sent to data service system 108 via packet switch 107 on cable 113. Packets from data service system 108 are transferred to data subscriber interface 104 or 105 via packet switch 107 where they are demultiplexed and distributed to the individual customers. Data subscriber interface 104 interfaces with packet switch 107 via cable 111. Administrative processor 106 provides overall system management of the data subscriber interfaces, such as recent changes, maintenance, traffic measurement, and billing.

The following description first presents a general description of the components constituting the data transport system and the use of the real-time clocks within the system by way of an example describing data transfer between customer 100 and data service system 108. Finally, a detailed description of programs used to synchronize the real-time clocks in the data subscriber interfaces with the administrative processor's real-time clock is given.

Consider an example of data transfer between customer 100 and data service system 108. Customer 100 first makes a request for service to data subscriber interface 104 via cable 109. This request causes data subscriber interface 104 to generate a call setup packet, which contains the customer's physical address in data subscriber interface 104. The call setup packet is multiplexed with other packets from other customers, such as customer 101, and forwarded to packet switch 107 via cable 111. Packet switch 107 translates the address contained in the call setup packet to an internal address, which is the address of the desired service of data service system 108. Services provided by data service system 108 can include home information services, such as electronic shopping, electronic news service, etc. Once data service system 108 receives the call setup packet, it determines whether or not the requested service is available. If the requested service is not available, a call reject packet is generated and returned to customer 100. If the requested service is available, data service system 108 generates a call accept packet, as defined by the X.25 protocol, which it forwards to data subscriber interface 104 via packet switch 107. Data subscriber interface 104 then returns a confirmation packet to customer 100; this informs customer 100 that the call has been established. Data subscriber interface 104 also reads its real-time clock and records the time of call setup for later inclusion in a billing record for the call. Once the call has been established, a virtual circuit has been set up by data subscriber interface 104, packet switch 107, and data service system 108 for the transfer of data packets between customer 100 and data service system 108. Data subscriber interface 104 maintains several separate counts of packets associated with this virtual circuit. A packet count is kept for each rate period that is defined in the data service charging tariff. When a data packet is transferred in either direction over the virtual circuit, data subscriber interface 104 uses its real-time clock to determine which packet count to increment. Either customer 100 or data service system 108 can terminate the call. To do this, either customer 100 or data service system 108 generates an end of call packet, which is sent through the data path, causing the path to be torn down. When the call is torn down, data subscriber interface 104 reads its real-time clock and records the time of call termination. It then transmits to administrative processor 106 a billing record containing the starting time and ending time for the call, as well as the counts of packets transferred during each rate period.

Figure 2:
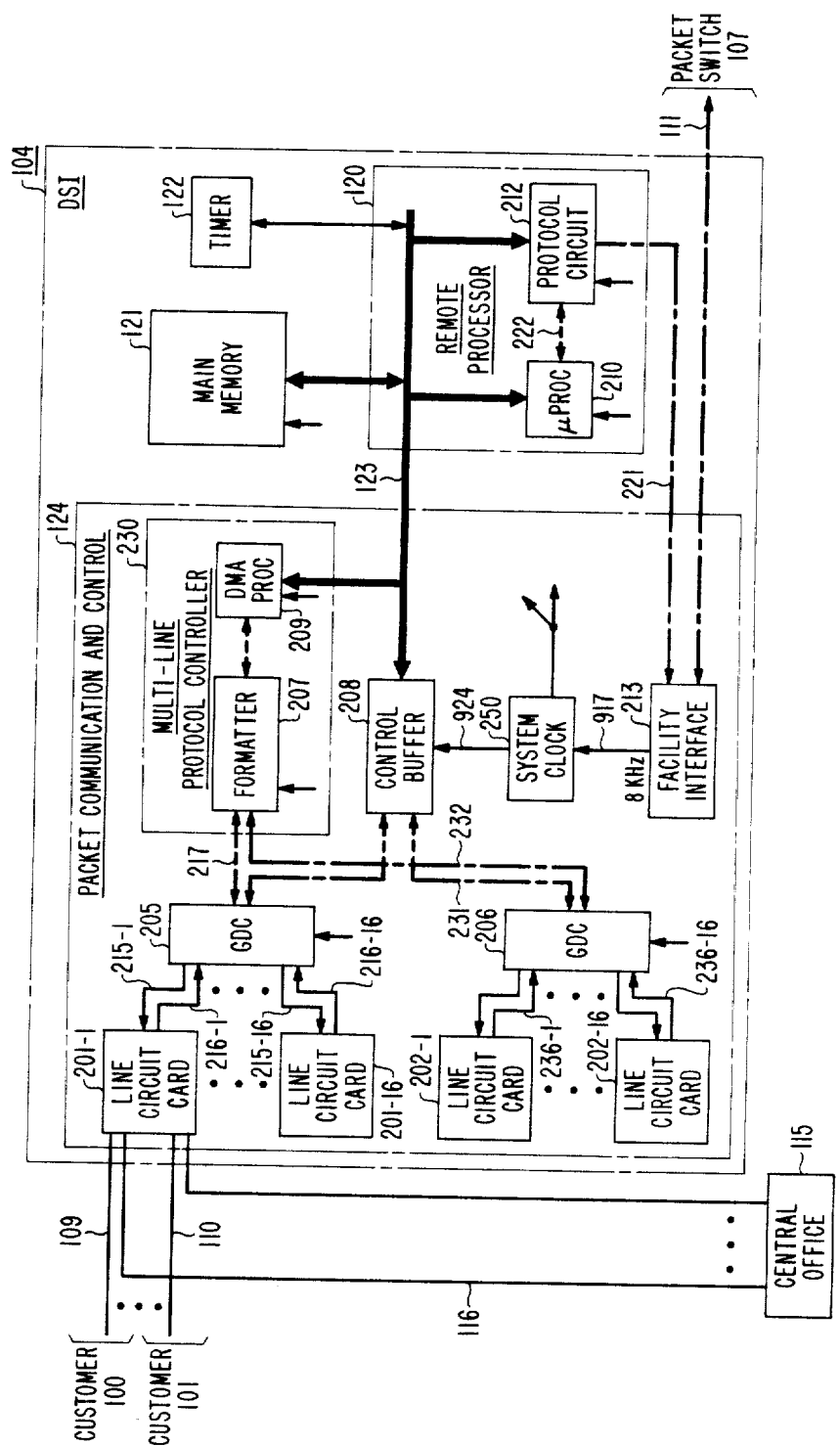
FIG. 2 is a detailed block diagram of data subscriber interface 104.

Data subscriber interface 104 is shown in greater detail in FIG. 2. The other data subscriber interfaces are similar to data subscriber interface 104. In the receive direction, data subscriber interface 104 receives packets at a 4.8kb/sec rate from each of the 128 customers, and transmits these packets at a 56kb/sec rate to data service system 108 via cable 113 and packet switch 107. In the transmit direction, data subscriber interface 104 receives packets from data service system 108 via packet switch 107, and distributes the packets to the correct customers. For the purpose of this description, transmit data refers to data coming from packet switch 107 and sent to the individual customers; receive data refers to the data originating from the customers and sent to packet switch 107. The following description first describes the receive data flow from customer 100 to packet switch 107. Then, the transmit data flow from packet switch 107 to customer 100 is described.

Customer 100 is connected to line circuit card 201-1 via cable 109, which is the normal telephone drop. In addition to customer 100, line circuit card 201-1 also has connected to it up to three other customers, such as customer 101, which is connected via cable 110. Line circuit card 201-1, which is similar to the other line circuit cards, such as line circuit card 201-16, provides filtering for each of the four customers, which separates the data signals from the normal voice signals. As illustrated in FIG. 1, the voice signals are forwarded to central office 115 via cable 116. Line circuit card 201-1 combines receive data and parity bits from the four customers into a 38.4kb/sec multiplexed serial bit stream, which is passed to group distributor circuit 205 via conductor 216-1. Group distributor circuit 205 receives a similar multiplexed serial bit stream from the 15 other line circuit cards 201-2 through 201-16 via conductors 216-2 through 216-16. Line circuit card 202-1 receives data from up to four customers, combines this data with parity into a 38.4kb/sec bit stream, and passes it to group distributor circuit 206 via conductor 236-1. Group distributor circuit 206 receives a similar multiplexed serial bit stream from the 15 other line circuit cards 202-2 through 202-16 via conductors 236-2 through 236-16.

The serial bit stream from line circuit card 201-1, which includes the data from customer 100, is passed to group distributor circuit 205 via conductor 216-1. Group distributor circuit 205 also receives a similar bit stream from the other the 15 line circuit cards. For example, group distributor circuit 205 receives a similar multiplexed bit stream from line circuit card 201-16 via conductor 216-16. Group distributor circuit 205 receives these 16 multiplexed bit streams in parallel and combines them into two 307.2kbit/sec serial bit stream, one containing data and one containing parity, which are forwarded to formatter 207 via cable 217. Similarly, group distributor circuit 206 forwards its two 307.2kbit/sec serial bit streams to formatter 207 via cable 232.

The two serial bit streams that are forwarded to formatter 207 contain the customer data for all 128 customers. This serial bit stream is divided into 128 time slots; each time slot contains a single data bit for one customer. Formatter 207 contains a receive state machine that continually samples each of the time slots and is thus able to identify and process each data bit from each of the 128 customers as that data bit becomes available. Formatter 207 converts the incoming serial bit stream into bytes for each of the 128 customers. Additionally, formatter 207 performs some of the level 2 protocol functions of X.25 (CCITT 1976, amended 1980). These protocol functions change the incoming frames (which include flag fields at the beginning and end of the frame, and a CRC code which is calculated over the entire frame) into packets. For convenience, the word "packet" in this and all subsequent uses refers to a packet that also contains level 2 control and address information. It should be understood that the use of this word "packet" is not identical to the packet specified in the X.25 protocol. An exception to this is a reference to a packet that is transferred from microprocessor 210 to protocol circuit 212; this packet is a packet that is specified in the X.25 protocol. Formatter 207 performs some of the level 2 protocol functions; the rest of the protocol functions are performed by DMA processor 209 and remote processor 120 and are described later. One protocol function performed by formatter 207 is calculating the CRC code of the incoming frame and checking the computed code with the CRC code included in the incoming frame. Formatter 207 then notifies remote processor 120, via DMA processor 209, if the CRC code indicates an error. Formatter 207 also performs flag recognition, to determine the beginning and end of incoming frames; and it performs bit unstuffing to remove bits stuffed by the customer equipment. Bit stuffing is done so that a flag pattern (01111110) never appears in any portion of the frame except the flag field. Bit stuffing is done as follows. Each time the customer equipment detects a sequence of five "1's" in any portion of the frame except the flag field, it automatically stuffs a "0". This bit stuffing prevents the flag pattern from ever appearing anywhere in the frame except the flag field. Whenever formatter 207 detects a sequence of five "1's" followed by a "0", it removes the "0", which is the bit that was stuffed by the customer equipment.

After formatter 207 has assembled a byte from customer 100, it transfers the byte to DMA processor 209. DMA processor 209 then writes the byte into a buffer in main memory 121 via direct memory access. The buffer in main memory 121 to which the byte is written is determined by DMA processor 209 reading a shared memory, contained in DMA processor 209. This shared memory has separate memory locations for each of the 128 customers. These shared memory locations are written by remote processor 120 and are used to pass the buffer location in main memory 121 to which the data bytes are to be written. This process continues until formatter 207 detects the end of the packet and notifies DMA processor 209 that an entire packet has been received. After the entire packet has been written, DMA processor 209 notifies remote processor 120, via a FIFO memory, that there is a packet assembled in main memory 121 that is ready to be transmitted to packet switch 107.

All transfer of data between DMA processor 209, remote processor 120, main memory 121, and protocol circuit 212, which is contained in remote processor 120, is via system bus 220. System bus 220 contains a separate data and address portion. The actual data transfer is via the data portion of the bus. The various memory locations to which data is written into and read from is under control of the address portion of system bus 220. In addition to the normal address and data, each portion of the bus also has parity bits associated with each data transfer. For a write operation, these parity bits are generated by the circuit that originates the write. For a read operation, these parity bits are generated by the circuit that is being read. For example, when DMA processor 209 writes data into main memory, DMA processor generates the associated parity bits for the data and address portions of system bus 220.

Once the packet has been written into main memory 121, remote processor 120 adds the necessary header information and inserts a logical channel number. Microprocessor 210 then notifies protocol circuit 212 that there is a packet ready for transmission. Protocol circuit 212 reads the buffer that contains the packet. via direct memory access, and forms the packet into a frame, which it then transmits to packet switch 107 via facility interface 213 and cable 111. This transformation of the packet into a frame conforms to level 2 of the X.25 protocol. This includes handling level 2 sequence numbers and level 2 acknowledgements, inserting a flag pattern at the beginning and end of the frame, stuffing bits as required, and calculating and inserting a CRC field.

Remote processor 120 comprises microprocessor 210 and protocol circuit 212. Microprocessor 210 provides control over system bus 220. This control consists of arbitrating over which of the circuits connected to system bus 220 has control of the bus at a given time. Microprocessor 210 also contains RAM and ROM memory, which are used for system initialization. Protocol circuit 212 performs the level 2 Link Access Procedure B (LAPB) of the X.25 protocol on the transmit and receive data. Additionally, it notifies microprocessor 210 each time it has transferred a packet into or out of main memory 121, via an interrupt on cable 222. Facility interface 213 provides a direct interface between packet switch 107 and data subscriber interface 104 over a 56kb/sec data link.

Consider an example of transmit data flow from packet switch 107 to customer 100. A frame destined for customer 100 is transmitted from data service system 108 and passed via packet switch 107 before entering data subscriber interface 104 in a serial manner on cable 111, which is a 56kb/s data link. This transmit frame passes to facility interface 213, which provides the control, clock, and data interface between packet switch 107 and the rest of data subscriber interface 104. The data and clock interface follow the V.35 standard (CCITT 1968, amended 1972 and 1976), and the control interface follows the RS-232 standard (EIA). The frame for customer 100 is then forwarded to the protocol circuit 212 portion of remote processor 120 over cable 221. Protocol circuit 212 performs level 2 protocol of X.25 on the incoming frame, in order to convert the frame to a packet. These protocol functions include flag detection and removal, and bit unstuffing. Additionally, protocol circuit 212 calculates the CRC of the frame and compares it with the CRC value that was present in the CRC field of the incoming frame. This is done to verify that no errors were introduced into the packet during the transmission from packet switch 107 to data subscriber interface 104. As protocol circuit 212 is performing these protocol functions, it is writing the packet into main memory 121. The packet is written into an assigned buffer. Once the entire packet has been written into main memory 121, protocol circuit 212 notifies microprocessor 210 via cable 222.

Microprocessor 210 then performs level 3 of X.25 protocol on the packet; this includes determining the customer to which the packet is intended, by looking up the logical channel number in a table located in main memory 121. Having identified the customer, microprocessor 210 reads its real-time clock and, based on the time of day, increments the appropriate packet count associated with the customer. Once microprocessor 210 has assembled a packet, it places the packet length and the location of the packet in main memory 121 into shared memory 506 in DMA processor 209. This is done to inform DMA processor 209 where in main memory the packet for customer is located, and how long the packet is. Microprocessor 210 then notifies DMA processor 209 that a frame is ready to be transmitted to a customer location by transmitting a command via a FIFO. DMA processor 209 then reads the first byte of data from memory 121 at the address specified by microprocessor 210. Once DMA processor 209 has read a byte, it writes the byte into the memory location that is associated with customer 100 in formatter 207.

Formatter 207 has one separate memory location for each customer. Formatter 207 scans the memory location associated with each of the 128 customers, and creates a multiplexed bit stream that consists of one bit from each of the 128 customer memory locations. Formatter 207 transmits this multiplexed bit stream to group distributor circuits 205 and 206. After beginning to process the data byte for customer 100, formatter 207 immediately requests another byte from DMA processor 209. DMA processor 209 reads the next byte from main memory 121 (via direct memory access), and transfers the byte to formatter 207; formatter 207 continues to request bytes and continues to forward the multiplexed bit stream to group distributor circuit 205. After DMA processor 209 has transferred the last data byte to formatter 207, (determined by the packet length value in the shared memory), it notifies formatter 207, and formatter 207 appends a CRC code, which it has been computing over all the data bits, to the end of the frame.

Group distributor circuit 205 receives the multiplexed bit stream (containing data for 64 customers) from formatter 207 and divides this bit stream into 16 separate bit streams. Each bit stream goes to one of the 16 line circuit cards associated with the group distributor circuit. Group distributor circuit 205 transfers 16 bits simultaneously. One of these data bits goes to line circuit card 201-1 via conductor 215-1; the other bits go to line circuit cards 201-2 through 201-16, via conductors 215-2 through 215-16. Line circuit card 201-1 routes the appropriate data bit to customer 100, and routes the other data bits to the associated customers. This process is repeated until the entire frame has been sent to customer 100.

A more detailed description of the components of data subscriber interface 104 is given in Chu-Hinch-Johnson-Kafka-Stelte, Case 1-1-1-1-1, "Digital Multi-Customer Data Interface", Ser. No. 481,057.

Figure 4:
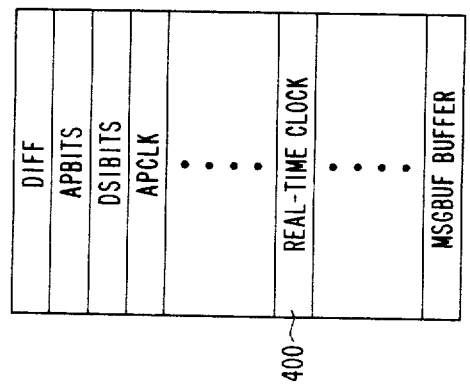
FIG. 4 is a memory map of memory 119 showing some of the information stored in memory 119.
Figure 3:
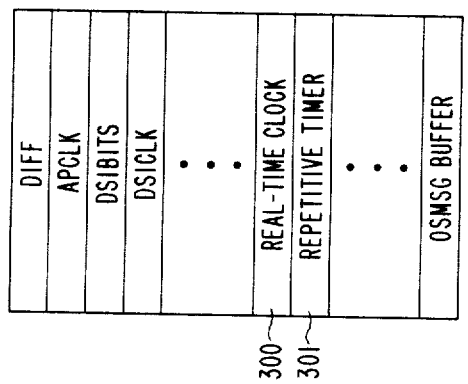
FIG. 3 is a memory map of memory 121 illustrating some of the information stored in memory 121.

Turning now to the method used to synchronize the real-time clocks contained in administrative processor 106 and remote processor 120, both processors are controlled by operating systems that are implemented using well known programming techniques. The operating system controlling remote processor 120 maintains real-time clock 300 and repetitive timer 301 in main memory 121 as illustrated in FIG. 3. Also, as illustrated in FIG. 3, various variables are stored within memory 121. The operating system controlling remote processor 120 maintains real-time clock 300 and repetitive timer 301 by using hardware timer 122 of FIG. 2 to determine fixed time periods. The operating system properly conditions timer 122 so that the latter causes an interrupt to microprocessor 210 once every 100 milliseconds utilizing well known programming techniques. The operating system uses this 100 millisecond interrupt to properly increment real-time clock 300 and repetitive timer 301. As is described later, repetitive timer 301 is used to create timing intervals of 900 seconds in duration. Similarly, administrative processor 106's operating system controlling administrative processor 106 maintains the real-time clock 400 and stores various variables in memory 119 as illustrated by FIG. 4. Real-time clock 400 is maintained utilizing timer 118 of FIG. 1 in a manner similar to that previously described for remote processor 120's operating system.

During system initialization, both operating systems create processes that perform the necessary functions of both processors. The function of concern for this invention is the synchronization of real-time clock 300 to real-time clock 400. To accomplish this synchronization, remote processor 120's operating system creates the DSI clock sync process at initialization time for performing the necessary synchronization functions within remote processor 120; and administrative processor 106's operating system creates the AP X.25 handler and AP clock sync processes at initialization time to perform the necessary synchronization functions in administrative processor 106.

As illustrated in FIG. 5, upon being initialized, the DSI clock sync process starts repetitive timer 301 to time for 900 seconds, and then the process enters an inactive state. After repetitive timer 301 has timed for 900-seconds, the operating system transmits a message to the DSI clock sync process. Upon receipt of a message from the operating system, the DSI clock sync process becomes active, reads the 8 least significant bits of real-time clock 300, formats these least significant bits into an interrupt packet, and executes an operating system call to transmit this interrupt packet to administrative processor 106 via packet switch 107. Upon receipt of the interrupt packet, the latter makes the AP X.25 handler process active, and the AP X.25 handler process reads real-time clock 400. The AP X.25 handler process then transmits a message to the AP clock sync handler process containing the transmitted 8 least significant bits of real-time clock 300 and the entire contents of real-time clock 400 by executing well known operating system calls. In response to the message, the AP clock sync handler process (1) calculates the difference between the transmitted least significant bits of real-time clock 300 and the 8 least significant bits of real-time clock 400, (2) assembles the calculated difference and the entire contents of real-time clock 400 into a data packet, and (3) transmits the data packet to remote processor 120 by executing well known operating system calls which result in the transmission of the data packet to remote processor 120 via packet switch 107.

Upon receiving the data packet from administrative processor 106, remote processor 120's operating system transmits a message to the DSI clock sync process containing the contents of the data packet. In response to the message, the DSI clock sync process adjusts the contents of real-time clock 300 to agree with the current state of real-time clock 400 by executing the following steps. First, the DSI clock sync process adds the transmitted calculated difference to the 8 least significant bits of real-time clock 300. Then, the DSI clock sync process replaces the 24 most significant bits of real-time clock 300 with the transmitted 24 most significant bits of real-time clock 400 and compares the least significant contents of real-time clock 300 with the transmitted least significant contents of real-time clock 400. Finally, if the transmitted least significant bits are numerically greater than the least significant bits of real-time clock 400, the data subscriber interface clock sync process adds "256" to the present contents of real-time clock 300 to properly adjust it since this condition must have been caused by the correct time crossing a 256-second boundary after the data packet from administrative processor 106 was transmitted.

Each of the previously mentioned processes is now described in greater detail. The data subscriber interface clock sync process is illustrated in FIG. 5, and a C program language implementation of this flow chart is given in appendix A. Upon initialization, data subscriber interface clock sync process executes block 501 which causes the repetitive timer 301 to be initialized, and then executes block 502 in which the process remains until a message is received from the operating system. Block 502 is the inactive state of the data subscriber interface clock sync process. Upon receipt of a message, decision block 503 is executed to determine whether the message is the result of repetitive timer 501 indicating the end of the timing interval, or the receipt of a packet from administrative processor 106 requiring the performance of clock synchronization. If the message is a result of the repetitive timer 501 indicating the end of the time interval, then the process transmits to the administrative processor 106 the 8 least significant bits of real-time clock 300 by executing blocks 504 through 506 so that administrative processor 106 will perform the necessary functions to synchronize real-time clock 300 to real-time clock 400. This periodic synchronization of the real-time clocks is performed to correct erroneous settings of real-time clock 300. The synchronization process is immediately invoked during the initialization of remote processor 120 by the operating system sending a message indicating that repetitive timer 501 has timed out.

After transmitting the interrupt packet to administrative processor 106 via the operating system and packet switch 107, the DSI clock sync process becomes inactive in block 502. When administrative processor 106 responds with the previously described data packet containing the difference between the two real-time clocks and the contents of real-time clock 400, remote processor 120's operating system transmits this information to the DSI clock sync process via a message. The process becomes active and executes decision block 503 in response to the message. Since the message resulted because of a packet from administrative processor 106, the process executes blocks 507 through 514. The latter perform the steps of updating the least significant 8 bits of real-time clock 300 with the difference that had been calculated by administrative processor 106. The results of these steps are stored in the variable DSICLK. Block 511 stores the 24 most significant bits of the transmitted contents of real-time clock 400 into the 24 most significant bits of the variable DSICLK. Blocks 512 and 513 determine whether it is necessary to add "256" to the present contents of the DSICLK variable to correct its value if a 256-second boundary has been crossed since the packet was transmitted by the administrative processor 106. Block 514 updates real-time clock 300 with the value which has been calculated and stored in variable DSICLK.

The AP X.25 handler process is illustrated in flow chart form in FIG. 6 and a C program language implementation of this flow chart is given in appendix B. The AP X.25 handler process becomes active when the administrative processor 106's operating system receives an interrupt packet from packet switch 107 and transmits a message to the AP X.25 handler process. The latter immediately reads real-time clock 400 and reads the transmitted least significant bits of the real-time clock 300 from the interrupt packet. The contents of real-time clock 400 are immediately read by this process so that a minimum time delay and a relatively predictable time delay will occur following the receipt of the interrupt packet and the reading of the contents of real-time clock 400. The AP X.25 handler process transmits these two pieces of information to the AP clock sync handler process by a message. The previously defined steps are illustrated by blocks 601 through 604 of FIG. 6.

The AP clock sync handler process is illustrated in FIG. 7 and a C program language implementation of this flow chart is given in appendix C. The AP clock sync handler process remains inactive in block 701 until a message is received from the AP X.25 handler process. When such a message is received, the AP clock sync handler process executes blocks 702 through 705 to calculate the difference between the transmitted 8 least significant bits of real-time clock 300 and the 8 least significant bits of the contents of real-time clock 400. Due to the manner in which the C code implementation is written, it is necessary to adjust the difference between these 8-bit quantities (stored in variable DIFF) in block 705. Blocks 707 through 709 are executed to transmit the time difference stored in variable DIFF and the contents of real-time clock 400 to the DSI clock sync process in remote processor 120 by utilizing known operating system calls and the packet transfer capabilities of administrative processor 106, remote processor 120 and packet switch 107.

It is to be understood that the above-described embodiment is merely illustrative of the principles of this invention; other arrangements may be devised by those skilled in the art without departing from the sphere and scope of the invention.

APPENDIX A

```
/*
DSI CLOCK SYNC
This subroutine represents the DSI end of the DSI-AP
clock synchronization algorithm.
*/
struct OSMSG {
int header;
char data[256];
};
struct mstruct {
int from;
int to;
int type;
};
struct packet {
char x25hdr[3];
char data[253];
};
#define ANY 0
#define APMESSAGE 35
#define APSYNC 11
#define INTERRUPT 5
TCsync( )
{
struct OSMSG buf;/* OS message buffer */
struct mstruct ms;/* OS message description */
int dsiclk;/* real-time clock value */
int dsibits;/* low 8 bits of clock */
int apclk;/* AP clock value */
int diff;/* clock correction value */
struct packet *pkt;/* pointer to data or
interrupt packet */
/* call OS to set up repetitive timer */
OSrtimer(900);/* send interrupt pkt every
900 seconds */
for(;;) {
/* wait for timer or for packet from AP */
OSgetmsg(ANY, &buf, &ms);
if(ms.type !=APMESSAGE) {
/* timer expired. Time to send
interrupt to AP */
dsibits = OSgetatime( ) & 0377;
pkt = formpkt(INTERRUPT, 1, &dsibits);
OSsendmsg(APSYNC, pkt);
continue;
}
/* Time sync message received from AP */
dsiclk = OSgetatime( );
apclk = *(int *)&(buf.data[0]);
diff = *(int *)&(buf.data[4]);
dsiclk + = diff;
dsiclk & = 0377;
dsiclk + = apclk & ~0377;
if((dsiclk & 0377) < (apclk & 0377))
dsiclk + = 256;
OSsetatime(dsiclk);
```

APPENDIX A-continued

```
       }
     }
```

APPENDIX B

```
/*
AP X.25 HANDLER
This subroutine is called when an interrupt
packet is received from a DSI.
*/
struct packet {
char x25hdr[3];
char data[253];
};
struct msgbuf {
int ms_to;
int ms_from;
int arg[10];
};
X25intr(pkt, chan)
struct packet *pkt;/* pointer to interrupt packet */
int chan; /* virtual channel number */
{
int apclk;/* real-time clock value */
int dsibits;/* low bits of DSI clock from packet */
struct msgbuf buf;/* interprocess message buffer */
apclk = gettime( );
dsibits = *(char *)&(pkt->data[0]);
buf.ms_to = kportid(chan);/* set message
destination */
buf.arg[0] = chan;
buf.arg[1] = apclk;
buf.arg[2] = dsibits;
queuemn(buf);/* send the message */
}
```

APPENDIX C

```
/*
AP CLOCK SYNC
This subroutine receives DSI interrupt packets from the X.25
handler and if necessary sends clock correction
messages to the DSI.
*/
struct packet {
char x25hdr[3];
char data[253];
};
struct msgbuf {
int ms_to;
int ms_from;
int arg[10];
};
APsync( )
{
struct msgbuf buf;/* storage for the message from
X25 handler */
struct packet data;/* storage for the data packet */
int apclk;/* real-time clock value */
int apbits;/* low 8 bits of apclk */
int dsibits;/* low 8 bits of DSI clock */
int diff;/* correction value */
for(;;) {
/* sleep until message arrives */
recvw(&buf);
dsibits = buf.arg[1];
apclk = buf.arg[2];
apbits = apclk & 0377;
diff = apbits - dsibits;
if(diff < -128)
diff + = 256;
if(diff > 127)
diff - = 256;
apclk = time(0);
formdpkt(&data, 2, apclk, diff);
sendpkt(&data, buf.arg[0]);
}
}
```

What is claimed is:

1. A method for synchronizing a plurality of real-time clock means in a computer system having first and second processor means and two types of packets for interprocessor communication with one type of packet being subject to flow control and an interrupt type of packet free of flow control, said method comprises the steps of:

sending an interrupt packet exempt from system flow control operations and comprising a limited segment of one of said real time clock means information from said first processor means to said second processor means;

calculating a correction factor in response to a receipt of said interrupt packet at said second processor means, said correction factor being a difference between said limited segment of said one of said real-time clock means information and a corresponding segment of another one of said real-time clock means information; and formulating a data packet subject to flow control comprising said correction factor and other data pertaining to said other one of said real-time clock means' information for transmission to said first processor means.

2. The method of claim 1 wherein said formulating step comprises the step of sending said data packet to said first processor means by said second processor means.

3. The method of claim 2 further comprising the steps of:

adding said correction factor to the contents of said one of said real-time clock means by said first processor means;

replacing another segment of said contents with another corresponding segment of the transmitted data pertaining to said other one of said real-time clock means' information by said first processor means; and adding a predefined value to said other segment of said contents upon the corresponding segment of said transmitted data of said other one of said real-time clock means being numerically greater than said segment of said contents to synchronize said other segment of said contents with said other corresponding segment of said other one of said real-time clock means's information.

4. A real-time clock means synchronization method using two types of packets with one type of packet being subject to flow control and an interrupt type of packet free of flow control, and said method comprises the steps of:

calculating in response to a receipt of a first packet exempt from system flow control operations a correction factor, said factor being a difference between a limited segment of a remote real-time clock means' information and a corresponding segment of a standard real-time clock means' information; and formulating a data packet subject to system flow control operations comprising said correction factor and other data pertaining to said standard real-time clock means' information for transmission to a remote processor.

5. A real-time clock means synchronization method using two types of packets with one type of packet being subject to flow control and an interrupt type of packet free of flow control, and said method comprises the steps of:

assembling an interrupt packet exempt from system flow control operations and containing a limited segment of remote real-time clock means information for transmission to a controlling processor; and updating said remote real-time clock means in response to a data packet subject to system flow control operations and comprising a correction factor and other controlling real-time clock means' information receivable from said controlling processor.

6. The method of claim 5 wherein said updating step comprises the step of adding said correction factor to the contents of said remote real-time clock means.

7. The method of claim 6 wherein said updating step further comprises the steps of replacing another segment of said contents with a corresponding segment of said other controlling real-time clock means' received information; and adding a predefined value to said other segment of said contents upon another segment of said other controlling real-time clock means' received information being numerically greater than said segment of said contents to synchronize said other segment of said contents with another corresponding segment of the contents of said controlling real-time clock means.

8. A method for synchronizing a plurality of real-time clock means in a packet switching system comprising a packet switch network having administrative processor means controlling one of said real-time clock means and a digital customer interface for communicating packets from a plurality of customer terminals to said packet switching system and said digital customer interface having remote processor means controlling another one of said real-time clock means, said method comprising the steps of assembling an interrupt packet comprising a group of bit signals of said other one of said real-time clock means for transmission to said administrative processor means by said remote processor means; and updating said other one of said real-time clock means by said remote processor means in response to a data packet from said administrative processor and formulated in response to said interrupt packet and containing bit signals representing the state of said one of said real-time clock means and bit signals representing the difference between a group of bit signals of said one of said real-time clock means and the transmitted group of bit signals of said other one of said real-time clock means for synchronizing the latter with said one of said real-time clock means.

9. The method of claim 8 wherein said updating step comprises the step of adding said difference bit signals to the contents of said other one of said real-time clock means by said remote processor means.

10. The method of claim 9 wherein said updating step further comprises the steps of replacing another group of bit signals of said contents with a corresponding group of transmitted bit signals of said one of said real-time clock means by said remote processor; and adding a predefined set of bit signals to said other group of bit signals of said contents by said remote processor means upon the transmitted group of bit signals of said one of said real-time clock means being numerically greater than said group of bit signals of said contents to synchronize said other group of bit signals of said contents with said corresponding group of bit signals of said one of said real-time clock means.

11. A method for synchronizing a plurality of real-time clock means in a packet switching system comprising a packet switch network having administrative processor means controlling one of said real time clock means and a digital customer interface for communicating packets from a plurality of customer terminals to said packet switching system and said digital customer interface having remote processor means controlling another one of said real-time clock means, comprising the steps of assembling an interrupt packet comprising the least significant bit signals of said other one of said real time clock means for transmission to said administrative processor means by said remote processor means;

calculating bit signals representing the difference between the transmitted least significant bit signals of said other one of said real-time clock means and the least significant bit signals of said one of said real-time clock means by said administrative processor means in response to said interrupt packet;

assembling a data packet comprising bit signals representing the state of said one of said real-time clock means and the difference bit signals for transmission to said remote processor means by said administrative processor means for synchronizing said other one of said real-time clock means with said one of said real-time clock means;

adding said difference bit signals to bit signals representing the state of said other one of said real-time clock means to form sum bit signals by said remote processor means;

adding a predefined set of bit signals to the most significant bit signals of said sum bit signals by said remote processor means upon the transmitted least significant bit signals of said one of said real-time clock means being numerically greater than the least significant bit signals of said sum bit signals; and storing said sum bit signals into said other one of said real-time clock means to update the latter to the present state of said one of said real-time clock means.

12. The method of claim 11 wherein said method further comprises the step of replacing the most significant bit signals of the stored sum bit signals with the transmitted most significant bit signals of said one of said real-time clock means by said remote processor means.

13. An arrangement for synchronizing a plurality of real-time clock means via a packet switching system having a remote processor means controlling one of said real-time clock means and an administrative processor means controlling another one of said real-time clock means, comprising said remote processor means being programmed for transmitting an interrupt packet to said administrative processor means comprising a group of bit signals of said one of said real-time clock means; and said remote processor means responsive to a receipt of a data packet from said administrative processor means and formulated in response to said interrupt packet and containing bit signals representing the state of said other one of said real-time clock means and bit signals representing the difference between a group of bit signals of said other one of said real-time clock means and the transmitted group of bit signals of said one of said real-time clock means for updating said one of said real-time clock means to be in synchronization with said other one of said real-time clock means.

14. The arrangement of claim 13 wherein said remote processor means responsive to a first set of programmed instructions for adding said difference bit signals to the contents of said one of said real-time clock means to update said contents.

15. The arrangement of claim 14 wherein said remote processor means further responsive to a second set of program instructions for replacing another group of bit signals of said contents of said one of said real-time clocks with a corresponding group of said other one of said real-time clock means' transmitted bit signals to synchronize said other group of bit signals of said contents with the corresponding group of bit signals of said other one of said real-time clock means; and said remote processor means further responsive to a third set of program instructions for adding a predefined set of bit signals to said other group of bit signals of said contents upon the group of said other one of said real-time clock means' transmitted bit signals being numerically greater than the updated group of bit signals of said contents to synchronize the other group of bit signals of said contents with the present corresponding group of bit signals of said other one of said real-time clock means.

16. An arrangement for synchronizing a plurality of real-time clock means via a packet switching system with each of said real-time clock means being controlled by an individual one of a plurality of processor means, comprising one of said processor means controlling one of said real-time clock means responsive to a first set of program instructions for assembling an interrupt packet comprising the least significant bit signals of said one of said real-time clock means for transmission to another one of said processor means;

said other one of said processor means controlling another one of said real-time clock means responsive to said interrupt packet and a second set of program instructions for calculating bit signals representing the difference between the transmitted least significant bit signals and the least significant bit signals of said other one of said real-time clock means;

said other one of said processor means responsive to a third set of program instructions for assembling a data packet comprising bit signals representing the state of said other one of said real-time clock means and the difference bit signals for transmission to said one of said processor means:

said one of said processor means responsive to the receipt of said data packet and a fourth set of program instructions for adding said difference bit signals to bit signals representing the state of said one of said real-time clock means to form sum bit signals;

said one of said processor means responsive to the formation of said sum bit signals and a fifth set of programmed instructions for adding a predefined set of bit signals to the most significant bit signals of said sum bit signals upon the transmitted least significant bit signals of said other one of said real-time clock means being numerically greater than the least significant bit signals of said sum bit signals; and said one of said processor means responsive to a sixth set of program instructions for storing said sum bit signals into said one of said real-time clock means to update the latter to the present state of said other one of said real-time clock means.

17. The arrangement of claim 16 wherein said fourth set of program instructions comprises a subset of program instructions and said one of said processor means further responsive to said subset of program instructions for replacing the most significant bit signals of said sum bit signals with the transmitted most significant bit signals of said other one of said real-time clock means.

* * * * *